United States Patent [19]

Kinjo et al.

[11] 4,321,621

[45] Mar. 23, 1982

[54] HIGH DENSITY RECORDING SYSTEM USING SIDE-BY-SIDE INFORMATION AND SERVO TRACKS

[75] Inventors: Hisao Kinjo; Keiji Ozawa, both of Yokohama, Japan

[73] Assignee: Victor Company of Japan, Ltd., Yokohama, Japan

[21] Appl. No.: 88,168

[22] Filed: Oct. 25, 1979

Related U.S. Application Data

[62] Division of Ser. No. 785,095, Apr. 6, 1977.

[30] Foreign Application Priority Data

Apr. 8, 1976 [JP] Japan ................................ 51-38809
Oct. 26, 1976 [JP] Japan ............................... 51-127767

[51] Int. Cl.³ ........................ H04N 5/76; G11B 21/06
[52] U.S. Cl. ................................. 358/128.6; 369/43; 369/275; 369/276; 369/126; 360/77; 360/135
[58] Field of Search ........................ 358/128.5, 128.6; 179/100.1 B, 100.1 G, 100.3 B, 100.3 D, 100.3 G, 100.3 V, 100.4 D; 360/77, 78, 135; 365/120; 124, 127, 215; 274/41.6 R, 42 R; 369/43–46, 111, 275-276

[56] References Cited

U.S. PATENT DOCUMENTS

| | | | |
|---|---|---|---|
| 3,263,031 | 7/1966 | Welsh | 360/77 |
| 3,396,243 | 8/1968 | McDaniel | 179/100.3 B |
| 3,438,050 | 4/1969 | Ashenbruner | 179/100.3 V |
| 3,479,664 | 11/1969 | Stuart-Williams et al. | 360/77 |
| 3,501,586 | 3/1970 | Russell | 179/100.3 V |
| 3,593,331 | 7/1971 | Connell | 360/77 |
| 3,624,284 | 11/1971 | Russell | 358/132 |
| 3,673,412 | 6/1972 | Olson | 179/100.3 V |
| 3,829,892 | 8/1974 | Nagahiro et al. | 360/27 |
| 3,864,740 | 2/1975 | Sordello et al. | 360/77 |
| 3,919,697 | 11/1975 | Walker | 365/120 |
| 4,056,832 | 11/1977 | de Boer et al. | 360/77 |
| 4,123,788 | 10/1978 | Kruger | 360/77 |

OTHER PUBLICATIONS

Tsilibes, Transducer Position Sensor, IBM Tech. Disc. Bulletin, vol. 4, No. 5, pp. 24–25, 10/61.
Matla et al., Track Servo System Compensating Servo Defects, IBM Tech. Disc. Bulletin, vol. 22, No. 8A, 1/80, pp. 3269–3270.
Bush et al., Magnetic Head Position Sensing, IBM Tech. Disc. Bulletin, vol. 16, No. 5, 10/73, pp. 1379–1380.

*Primary Examiner*—Raymond F. Cardillo, Jr.

[57] ABSTRACT

An information signal recording system records both an information signal and at least one kind of reference signal for providing a tracking control on a recording medium. The reference signal is recorded on an intermediate part of the recording medium. That part is located between the center lines of adjacent tracks on which the information signal is recorded.

7 Claims, 41 Drawing Figures

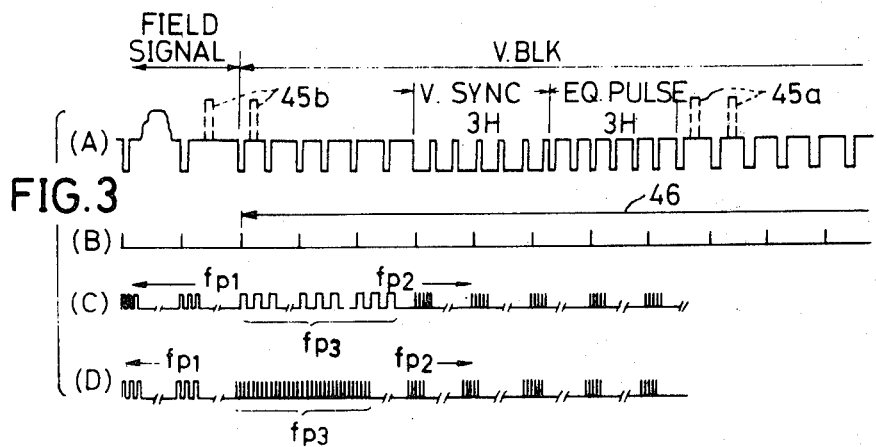
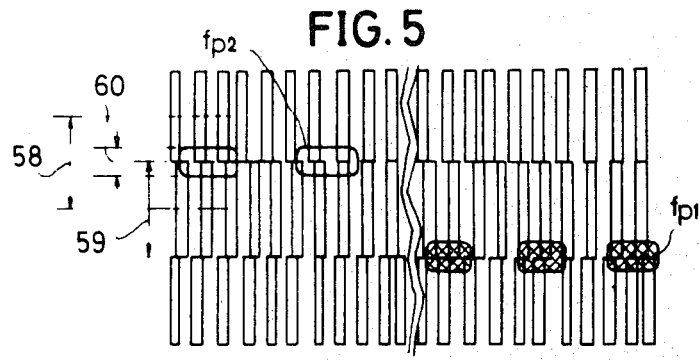
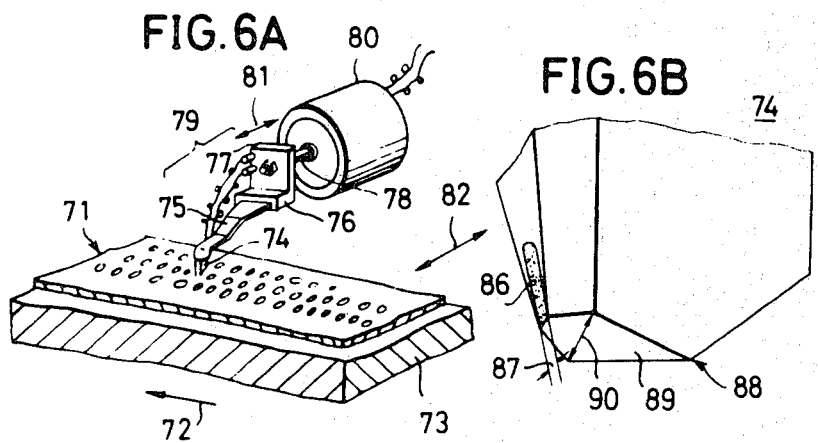

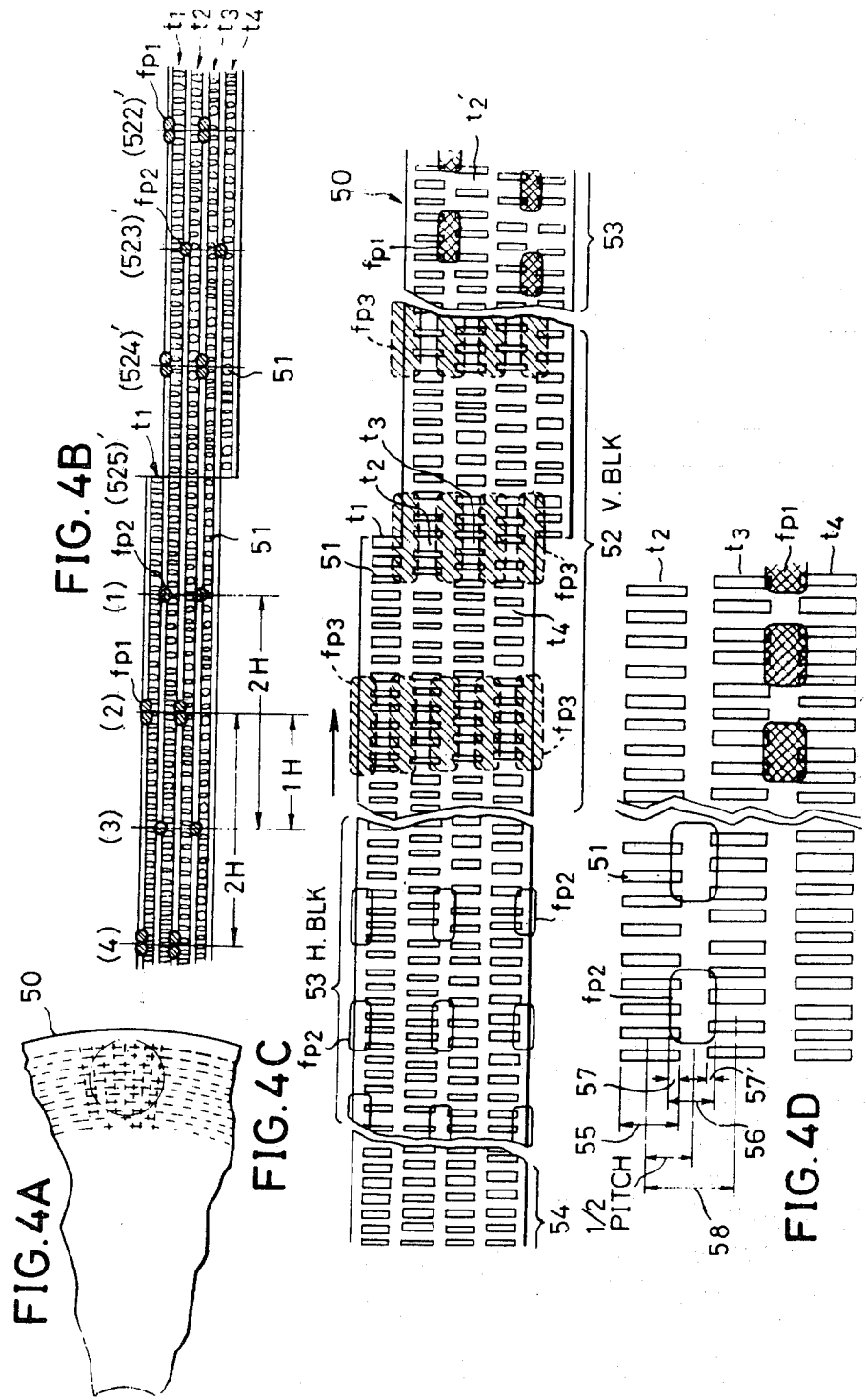

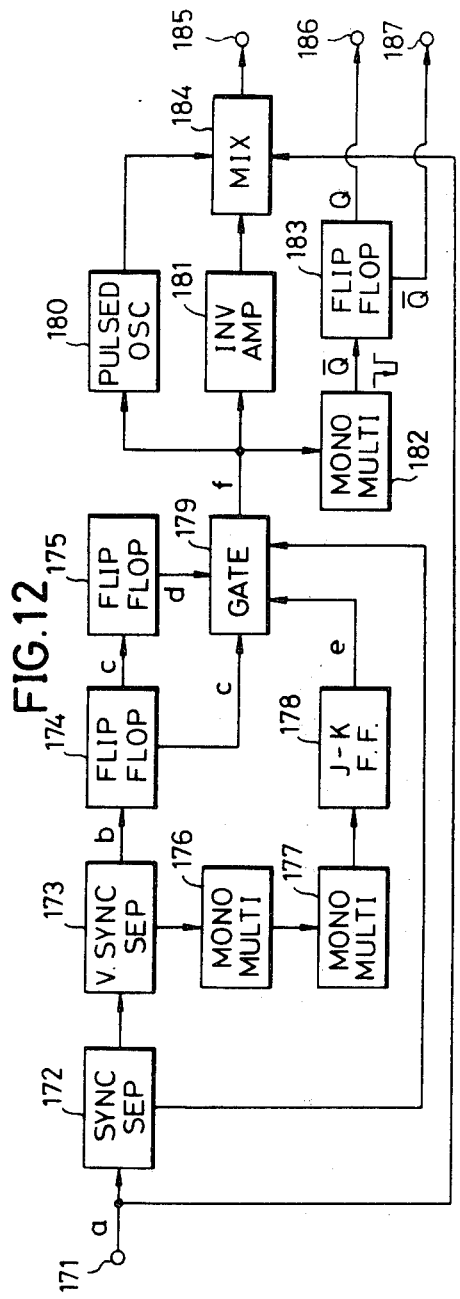
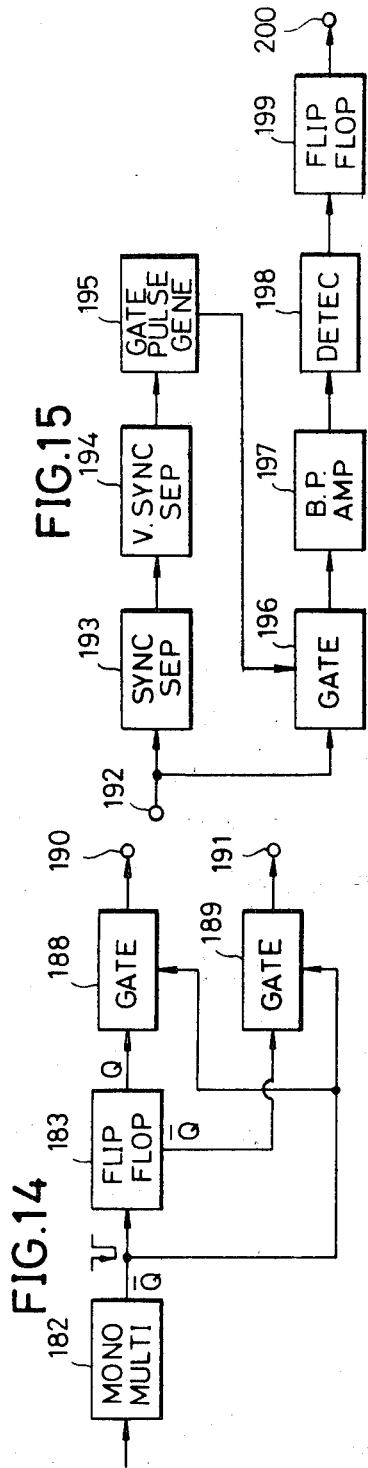

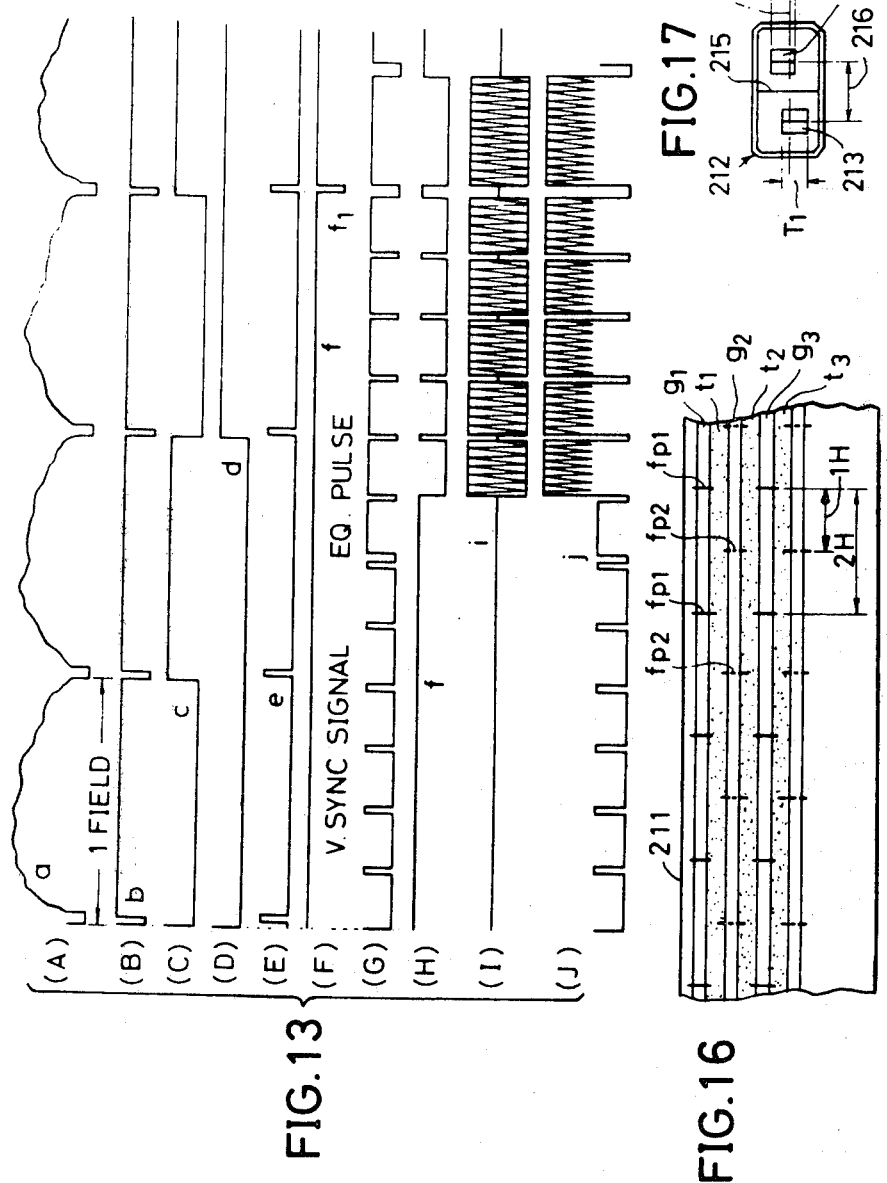

HIGH DENSITY RECORDING SYSTEM USING SIDE-BY-SIDE INFORMATION AND SERVO TRACKS

This is a division of application Ser. No. 785,095, filed Apr. 6, 1977.

BACKGROUND OF THE INVENTION

The present invention relates generally to systems for recording and reproducing information signals on and from recording mediums, and more particularly to a system for recording an information signal with high density and, moreover, for recording a reference signal for providing tracking control at specific positions on a recording medium and reproducing the same.

A laser beam is used in one example of a system for recording and reproducing an information signal with high density. A video signal and/or an audio signal are recorded on and reproduced from a recording medium. In this system, a laser beam is used to record and reproduce the information signal optically on and from a rotating recording medium. In the reproducing portion of this system, it is necessary to exercise tracking control so that the reproduction laser beam will accurately trace the track recorded on the rotating recording medium.

One known example of a system for accomplishing this tracking control uses a light beam obtained by dividing a light beam normally used for reproducing after it is reflected from the recording medium. The divided beam is used for tracking control. Another known tracking control system uses a reproducing light beam which is divided into one main light beam for reproducing and two subsidiary light beams for tracking. The tracking control is achieved by these subsidiary light beams.

All of these known tracking control systems, however, have required complicated and expensive apparatus, have produced unstable operation, and have been incapable of accomplishing positive and accurate tracking control.

Accordingly, a possible system for solving these problems accompanying known tracking control systems would appear to use a single laser beam system. The beam records a main information signal and is deflected at a specific part on the main information track. The deflected beam records a tracking signal on this specific part. In this system, however, at least the main information signal is disturbed or interrupted by the deflection. Consequently, a continuously reproduced signal of high quality cannot be obtained. Furthermore, means for compensating for the interrupted signal is necessary. The reproducing apparatus becomes complicated and expensive.

Another example of a system for recording and reproducing information signals is a system which records and reproduces an information signal as a variation of electrostatic capacitance or as a variation of mechanical vibration. A rotating recording medium reproduced by these systems has a spiral guide groove formed thereon, for guiding a tracing stylus used for reproducing a signal. Along the bottom part of this guide groove, there is formed a track of an information signal which is recorded as a variation of a geometrical configuration. The tracing stylus is guided by this guide groove while tracing the bottom thereof and thus reproduces the recorded information signal.

However, a recording and reproducing system of this known type has been accompanied by various problems as enumerated below.

(a). If a video signal is to be recorded as an information signal, the groove pitch on the recording medium unavoidably must be made less than a number of $\mu$m, because the frequency band of a video signal is wide and is recorded with high density. As a consequence, the area of the contact with the recording medium and the shape of the tracing stylus are limited by the groove pitch dimension. For this reason, there is a large contacting force per unit area at the contacting parts between the tracing stylus and the recording medium. As a consequence, the serviceable life of the tracing stylus and of the groove on the recording medium are very short.

(b). The stylus jumps if the stylus pressure is reduced in order to suppress abrasive wear of the tracing stylus. The stylus pressing force has been reduced to a minute value of 30 mgr., for example, with a resultant jumping of the stylus.

(c). As the abrasive wear of the tracing stylus progresses, it becomes increasingly easy for the tracing stylus to vibrate within the guide groove. Under this condition, the reproducing operation becomes unstable. Furthermore, the wear of the tracing stylus is promoted. This vibration phenomenon is attributable to the sticking and slipping of the tracing stylus which occur within the guide groove at the time when the tracing stylus is being compulsorily guided by the guide groove.

(d). When the tracing stylus vibrates, a great pressure is applied locally in a concentrated manner on the side walls of the guide groove. The film on the groove side wall surface is scraped off. Particularly, severe scraping occurs at the outer peripheral part of a rotating recording medium where the relative velocity of the tracing stylus and the recording medium is large. It is observed that the scraping of the guide groove wall surfaces are converted into the state of fish scales.

(e). As another consequence of the above described abrasive scraping, fine pieces of scraped off film adhere to the tracing stylus and give rise to frequent interruptions or skipping and deterioration of the reproduced signal. As a result of observation and an analysis of the foreign matter adhering to the tracing stylus under these circumstances, it was discovered that the foreign matter comprised the dielectric material covering the recording disc surface and the underlying metal film material. In some cases, it was found that the foreign matter further contained polyvinyl chloride (PVC), which is the material of the recording disc. This finding verifies that the foreign matter deposited on the tracing stylus is not a substance which has infiltrated from the outside, but comprises almost entirely materials scraped off from the recording disc.

(f). If a tracing stylus is compulsorily guided by the guide groove, it is theoretically impossible to have special modes of reproduction such as still motion, slow-motion, intermittent frame-by-frame, high-speed searching for a reproduction start point, and information search, etc.

(g). The tracing stylus and the guide groove are very fine and intricate in shape, and therefore are difficult to make.

(h). Since the signal groove has been formed on the recording disc, the process of recording the information signal on the original disc is laborious and complicated.

Accordingly, in order to overcome the various above described problems which arise from the guide groove, the invention sets forth the recording of an information signal as a variation of a geometrical form on a rotating recording medium, without providing a guide groove.

However, since there is no groove for compulsorily guiding the tracing stylus, it is necessary to provide means for causing the tracing stylus to trace positively and accurately over the recorded track. Accordingly, the invention provides a tracking control of the tracing stylus so that it will trace accurately and positively over the recorded track. The invention has made it possible to record and reproduce signals in a system which does not have a guide groove, as described above.

SUMMARY OF THE INVENTION

Accordingly, it is a general object of the present invention to provide a novel and useful system for recording and reproducing information signals in which the above described problems have been solved.

Another object of the invention is to provide a recording and reproducing system in which a reference signal is recorded for tracking control. The tracking signal is midway between the centers of mutually adjacent information signal recording tracks. At the time of reproducing, the information signal and the reference signal are reproduced simultaneously by a single reproducing tracing means (e.g., a tracing stylus, a reproducing beam, or a head). The tracking by the reproducing tracing means is controlled through the use of a reference signal extracted from the resulting reproduced signal.

Another object of the present invention is to provide a system for recording information signals and reference signals with separate beams. In accordance with the system of the present invention, the information signals are recorded continuously.

A further object of the present invention is to provide a system for recording information signals and reference signals without forming guide grooves for guiding a reproducing tracing stylus. In accordance with the system of the present invention, no guide grooves are required to provide the tracking control of the reproducing tracing stylus. At the time of reproducing, tracking is effected with high fidelity with the reference signals thus recorded. Thus, the preferred reproduction is carried out without any guide grooves. Moreover, special modes of reproduction such as still motion, slow motion, or quick motion are easily effected.

Still a further object of the present invention is to provide a system for recording information signals and reference signals so that at least a portion of a reference signal is superimposed on an information signal track. In accordance with the system, an accurate tracking control of the reproducing tracing means is accomplished in a reproducing system.

Further objects and features of the present invention will be apparent from the following detailed description when read in conjunction with accompanying drawings.

BRIEF DESCRIPTION OF THE DRAWINGS

In the drawings:

FIG. 2A through FIG. 2D and FIG. 3A through FIG. 3D are signal waveform diagrams respectively for explaining the operation of the system in the block diagram shown in FIG. 1;

FIG. 4A through FIG. 4D are successively enlarged views showing a portion of a track pattern of a first embodiment recorded and formed on a rotating record medium in accordance with a system of the present invention;

FIG. 5 is an enlarged view of a second embodiment of a track pattern recorded and formed in accordance with the present invention;

FIGS. 6A and 6B are respectively a perspective view showing one embodiment of a tracing reproduction means which is usable in the system of the present invention, and an enlarged perspective view, as viewed from the bottom, showing a tip portion of the tracing stylus;

FIG. 12 is a block diagram showing an essential part of a second embodiment of a recording system according to the present invention;

FIG. 13A through FIG. 13J are respectively signal waveform diagrams for explaining the operation of the block diagram in FIG. 12;

FIG. 14 is a block diagram showing an essential part of a modification of the embodiment in FIG. 12;

FIG. 15 is a block diagram showing an essential part of a third embodiment of a reproducing system according to the present invention;

FIG. 16 is an enlarged view showing a part of the track pattern on the rotary magnetic disc recorded and formed in accordance with the system of the present invention; and FIG. 17 is an elevation view showing a magnetic head used for recording on and reproducing from the rotating magnetic disc.

DETAILED DESCRIPTION

A first embodiment of a recording system, according to the present invention, is described with reference to FIG. 1 through FIG. 3.

Figure 1:
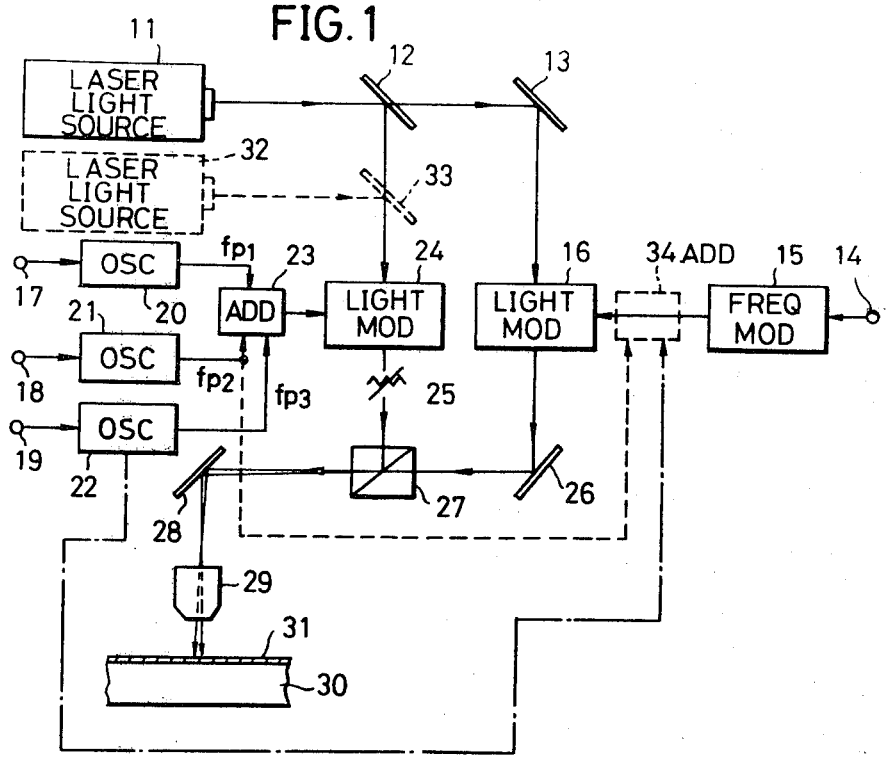
FIG. 1 is a block diagram showing a first embodiment of a recording system according to the present invention.
Figure 2:
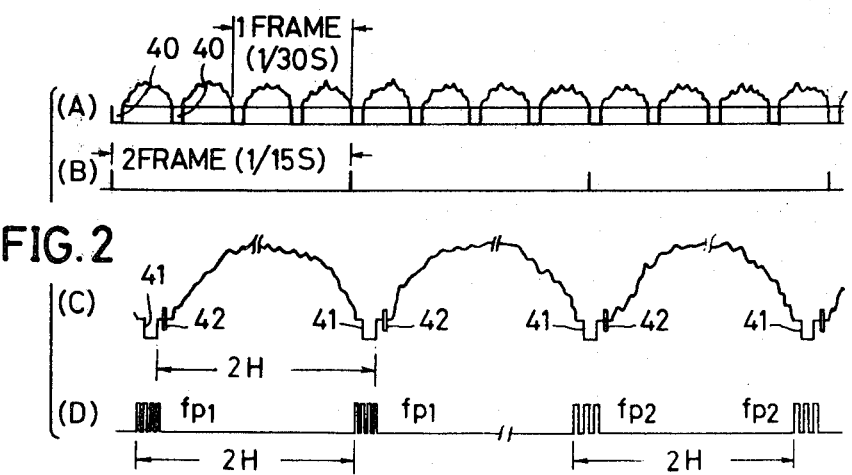

Referring to FIG. 1, a part of a laser beam projected from a laser light source 11 is reflected, by a half-mirror 12, to a light beam modulator 24. The remaining part of the projected laser beam passes through the half-mirror 12 and is reflected by a reflecting mirror 13 to a light beam modulator 16. A recording information signal including a color video signal and an audio signal is introduced through an input terminal 14 and is supplied to a frequency modulator 15 when it frequency-modulates a carrier. The output frequency modulated signal is applied to the light beam modulator 16 when it modulates the laser beam. The above described color video signal is indicated in FIG. 2A with a unit of a vertical synchronizing pulse 40, and in FIG. 2D with a unit of the horizontal synchronizing pulse 41. A first modulated light beam, which has been modulated by the frequency modulated signal at the light beam modulator 16, is reflected by a reflecting mirror 26 and passes through a polarization prism 27 and is then reflected by a reflecting mirror 28. The first modulated light beam thus reflected enters as an incident beam into an objective lens 29. The beam passed through the lens 29 is focused in such a manner so that a focal point of the lens 29 coincides with a sensitive material 31 coated on an original recording disc 30 made of a material, such as glass. Either a spiral main track or a concentric circle formed main track is recorded and formed with a variation of geometrical configuration.

Switching pulses are applied to oscillators 20, 21 and 22 through input terminals 17, 18, and 19, respectively. The switching pulses cause, for instance, the oscillators 20, 21 and 22 to have an output during the interval of positive pulse polarity, and to have no output during the interval of negative pulse polarity. The oscillator 20, 21, and 22 oscillate at their original frequencies and generate signals having, respectively, single frequencies fp1 (e.g., 700 KHz), fp2 (e.g., 500 KHz), and fp3 (e.g., 300 KHz).

When every two-frame video signal is to be recorded on the disc 30 per rotation thereof, for instance, first and second pulses are used alternatively during every two-frame interval. These are input switching pulses which are supplied to the input terminals 17 and 18. The first switching pulse is obtained by separating the vertical synchronizing pulse 40, FIG. 2(A), from the recording color video signal, and then by subjecting the pulse 40 to a ¼ count-down operation. The resulting first switching pulse is a pulse having a two-frame interval, FIG. 2(B). The second switching pulse is obtained by separating the horizontal synchronizing pulse 41, FIG. 2(C), from the input video signal every 1H (H: horizontal scanning period). Then, its pulse width is synchronized with a horizontal blanking period (abbreviated as H.BLK hereinafter). The pulse width is selected so that a reference signal for tracking control does not affect a color burst signal 42, FIG. 2(C). Consequently, the signal fp1 is sent from the oscillator 20 for a two-frame interval (1/15 second), in a time-phase relationship as indicated in FIGS. 2(C) and 2(D), respectively. Following this, the signal fp2 is sent from the oscillator 21 for the following two-frame interval, in the time-phase relationship, as indicated in FIGS. 2(C) and 2(D), respectively. The signals fp1 and fp2 are thereafter sent every two-frame period, successively and alternately.

In correspondence to the time point when the signals fp1 and fp2 switch, a third reference signal fp3 is sent out from oscillator 22. This signal fp3 is an index pulse at the time of reproduction.

The invention may be used to carry out a special reproduction such as still-motion or slow-motion. It is particularly useful if the information signal is principally a video signal. A kick-back control is required for shifting or forcibly transferring a reproducing tracing means tracing one track to another track, within a vertical blanking period (abbreviated as V.BLK hereinafter). For this kick-back control operation, the signal fp3 is recorded at the V.BLK part of the video signal. FIG. 3(A) shows the V.BLK part of the video signal. The pulses, designated by 45a in FIG. 3(A), may be recorded as the signal fp3 during two or three H periods at the initial horizontal synchronizing pulse part following equalizing pulses, projecting toward the white side. However, when the tracing stylus is actually kicked back by the signal fp3, at the time of still-motion reproduction or slow motion reproduction, the tracing stylus is not stabilized on a predetermined track immediately after jumping. Rather, the tracing stylus hunts to some extent. Interrelatedly with a response characteristic of the mechanism for moving the tracing stylus, some noise may appear on the upper part of the picture responsive to the kick-back operation.

Therefore, in order to kick back completely within the V.BLK interval, the switching operation is carried out at the time of signal recording and reproduction either just before or just after the respective ends of the video signal intervals. As a consequence, the signal fp3 should be inserted and recorded at a position designated 45b in FIG. 3(A), with respect to the recording video signal.

The present invention is not limited to the production of a video disc on which at least the video signal has been recorded. It may be used interchangeably to reproduce the video disc and the audio disc on which the audio signal has been recorded. The audio signal does not contain any periodic signal such as horizontal or vertical synchronizing pulses. Thus, it is not appropriate to record the signal fp3 with the timings indicated by 45a and 45b in FIG. 3(A), from a point of view of compatibility. Accordingly, the signal fp3 may be recorded as described hereinafter.

1. The signal fp3 has a frequency which is lower than the frequency range of the main information signal to be recorded. This signal continues for an appropriate period of time, and then adder 34 (FIG. 1) superimposes it, at a proper level, on a predetermined part of the main information signal. The superimposed signal is recorded by the first modulated light beam, on the same one track.

2. The signals fp3, fp1, and fp2 are supplied to an adder 23 for a predetermined period of time as indicated in FIGS. 3(C) and 3(D). It is recorded as a second modulated light beam, described hereinafter.

For instance, the method 2 will be described in detail hereinafter. An output signal of the adder 23 is indicated in FIG. 3(C) or FIG. 3(D). FIG. 3(C) indicates a waveform wherein the signal fp3 is recorded at a switching position of the signal fp1 and the signal fp2. Signal fp3 is an intermittent oscillation pulse extending over two or three H periods of time. FIG. 3(D) indicates a waveform where the signal fp3 is recorded continuously for a somewhat wider predetermined period of time.

FIG. 3(B) indicates a reference pulse for controlling the rotation of the recording disc 30 with accuracy. If only the H period pulse is to be recorded, the H period pulse is synchronized in phase with the video signal or with the audio information. In the case of recording the video signal, the interval designated by numeral 46 corresponds to the V.BLK period of the video signal. The H period pulse has relationships with the phases of the reference signals fp1 and fp2, as indicated in FIGS. 3(B), 3(C), and 3(D), respectively.

As a modification, the signals fp1 and fp2 may be inserted or removed successively and alternately even in the part where the signal fp3 has been inserted. Further, even if the signals fp1 and fp2 are dropped out for three or four H periods by recording the signal fp3, there are no deleterious effects in the tracking servo operation.

The output signal of the adder 23 is applied, as a modulation signal, to the light beam modulator 24. The second modulator output light beam from the light beam modulator 24 is attenuated by a light filter 25. The brightness (beam light quantity) is adjusted to be attenuated appropriately in comparison with the quality of light of the first modulated light beam. The attenuated second modulated light beam thereafter advances to a polarization prism 27, where the polarization plane of the light beam is deviated by 90° with respect to the polarization plane of the first modulated light beam.

The second modulated light beam which has passed through the polarization prism 27, together with the first modulated light beam, is reflected by the reflecting mirror 28 and passes through the objective lens 24. Then, the beams irradiate the sensitive material 31 on the rotating recording disc 30. The polarization prism 27 adjusts the incident light path of the second modulated light beam toward the objective lens 29, with respect to the first modulated light beam. The irradiation part on the rotating disc 30 moves in the radial direction thereof by a predetermined pitch. A spiral track, for instance, is formed as a change of the geometrical configuration, in accordance with the recording information signal. As a result of this adjustment, the second modulated light beam records and forms a subtrack, which is separated by approximately a ½ track pitch from a main track formed by the first modulated light beam. Here, the track pitch refers to a distance between two tracing center lines of adjacent tracks. Further, in the above described recording system, a guide groove for guiding the reproducing tracing stylus is not formed, not even for a disc adapted to be used in the reproducing system wherein a tracing stylus is used as a reproducing tracing means.

Moreover, it may not be appropriate to divide the beam into two beams by the half-mirror 12. For example, the beam power of the laser light source 11 may be too low. If so, another laser light source 32 (indicated by a dotted line in FIG. 1) may be additionally provided. In this case, the light beam intensity, the modulation index, and the like, of the beam projected from the laser light source 32 are appropriately adjusted with respect to the first modulated light beam.

The light beam projected from the laser light source 32 is reflected by a reflecting mirror 33 and is then supplied to the light beam modulator 24. Moreover, interrelatedly with the provision of the laser light source 32, the half-mirror 12 is omitted and the light beam projected from the laser light source 11 is supplied to only the light beam modulator 16.

If the main recording information signal is a color video signal, the reference signals may be obtained by frequency dividing a chrominance sub-carrier of the color video signal.

Further, instead of recording with a light beam, the recording is by a double electron.

Accordingly, a track pattern recorded on the disc by the system in FIG. 1 is as indicated in FIG. 4A through FIG. 4D, for instance. The signals fp1, fp2 and fp3 are recorded in alignment in the radial direction of the disc 50. FIG. 4B schematically shows the first embodiment of the track pattern which circles the disc indicated in FIG. 4A, for convenience of description. A track pattern indicated in FIG. 4C is a magnification of part of the track pattern in FIG. 4B. In FIG. 4B, numerals (1), (2), (3), . . . respectively indicate parts where the first, the second, the third . . . horizontal synchronizing signals of the first frame of the video signal are recorded. Numerals (521)', (522)', . . . (525)' respectively indicate parts where the 521st, the 522nd, . . . the 525th horizontal synchronizing signals of the second frame of the video signal are recorded. That is, in the present embodiment, two frames of the video signal having 525 horizontal scanning lines per one frame are recorded for every rotation of the disc.

In FIG. 4C, reference marks t1, t2, t3, . . . respectively designate the first, the second, the third . . . main tracks which are recorded and formed, one track during every rotation of the disc 50. The recording is made by forming a number of intermittent pits 50. The reference signals fp1 and fp2 are recorded alternately with a period of one rotation between them. The reference signals are formed by intermittent pits located between the adjacent main tracks. The pits are shallow in comparison with the depth of the pits of the main track. Further, although the illustration is omitted in FIG. 4B for the sake of simplification, the reference signal fp3 is recorded as a timing pulse at a position 52 where the recording of the signals fp1 and fp2 is switched, as indicated by a broken line in FIG. 4C. The switched position corresponds to a position (525)' in FIG. 4B.

If the main information signal comprises at least the video signal, a recording of the reference signals is effected similar to the recording in the preceding description. That is, in order to prevent the beat disturbance of a cross modulation between the reference signals and the video signal, the signals fp1 and fp2 are recorded within a H.BLK interval, as indicated by the numeral 53 in FIG. 4C. The signal fp3 is recorded at a V.BLK part 52. Therefore, none of the signals fp1, fp2, and fp3 is recorded in the video information period 54.

Further, to record and reproduce the signals fp1 and fp2 with higher sensitivity, the present embodiment is arranged so that the positions of the signals fp1 and fp2 are respectively alternately recorded separately along every track. These signals are located at positions in the H.BLK period with a period of 2H interval. Furthermore, the recording of the signals fp1 and fp2 is such that the recording positions of the signals fp1 and fp2 are located within the H.BLK period at positions which are separated or deviated by every 1H interval, alternately with respect to the adjacent tracks. According to this arrangement, the signals fp1 and fp2 are recorded without affecting the main information signal. Further, the reference signals can be recorded with a wider dimension even when the main information signal is recorded with very small track pitch, i.e., with high density. The reference signals can be reproduced in a stable manner, thereby stabilizing the tracking control operation. However, the signals fp1 and fp2 may be recorded at positions corresponding to every H.BLK of the video signal. Further, by using a single low frequency, the reference signal can be reproduced in a stable manner. This low frequency has a longer wavelength as compared to the reference signals described hereinbefore.

FIG. 4D indicates a part of the track pattern indicated in FIG. 4B, with further enlargement. The track pattern is formed by recording a main track with track pitch 58 (e.g., 2.8 μm), pit width 55 (e.g., 2.6 μm), and a sub-track with pit width 56 (e.g., 1.2 μm) at an intermediate position between the adjacent main tracks, with overlap on the main track at parts 57, 57'.

FIG. 5 is an enlarged plan view showing a part of a track pattern of a second embodiment. The track pattern is formed by recording the main track with a track pitch 58 of 2.8 μm, which is the same as that of the main tracks in FIG. 4D. The track pitch coincides with the pit width 59 without any vacant space between the adjacent main tracks. Also, the sub-track is recorded with a pit width 60 of 1.0 μm, for instance, at the intermediate part between the center lines of adjacent main tracks so as to entirely overlap on the main track. The track pattern set forth is more effective for increasing or improving the signal reproducing sensitivity and the recording density of the information track.

Furthermore, the signals fp1 and fp2 may be recorded with pits of a size which will not overlap with respect to the main information pit pattern. However, as shown in FIGS. 4B, 4C, 4D, and 5, it is desirable for the information pits of the main information signal and the pits of the signals fp1 and fp2 to be formed at the intermediate parts of the main information signal pits. Moreover, the pits of signals fp1 and fp2 partially overlap parts with respect to the pits on both of their sides. Even when recording is carried out in this manner, the above mentioned reference signal has no deleterious effect whatsoever on the main information signal, particularly as long as the reference is within the horizontal blanking period.

In this case, since the reference signal recording track has a greater width, the stabilization of the tracking control operation becomes better. However, for accomplishing an excellent reproduction of the main information signal, it is desirable that only one of the signals fp1 and fp2 be recorded in the corresponding parts of the horizontal blanking period of the main information signal recording track. This can be done by recording the signals fp1 and fp2 intermittently with periods 2H, 3H, . . . etc., for example.

As is known, if the main information signal is an audio signal, there is no periodic signal such as a horizontal synchronizing pulse in the audio signal. However, by recording the reference signals fp1 and fp2 with different phases, respectively front and rear, in the rotational direction at the opposite lateral side parts of the audio signal track, tracking control can be accomplished even more advantageously than in the above described case. The reference signal recording position is limited to the part corresponding to the horizontal blanking period.

As is also known in this connection, the horizontal scanning frequency of a television video signal of the NTSC system is 15.75 KHz. Since the rotational speed of the disc 50 in this embodiment is 900 rpm, the fundamental error period at the time of disc eccentricity is merely 15 Hz. This period is ample to provide the information tracking control.

Moreover, instead of using the signal fp3, the deficient part is detected and discriminated from the other recording part. The reproduced signals fp1 and fp2 pass through an integration circuit at the time of the reproducing mode, without recording the signals fp1 and fp2 during the 2H through 3H intervals within the V.BLK period.

FIG. 6A shows one embodiment of the reproducing tracing means suitable for use in the inventive reproducing system. A disc-shaped recording medium (disc) 71 has on its surface a thin metal film coating. On this disc surface, pits of the main information signal and reference signals fp1 and fp2 are respectively recorded on opposite lateral sides, as shown in FIGS. 4 and 5. The disc 71 is positioned on and rotates with a turntable 73 rotated synchronously by a disc motor (not shown) at, for example, 900 rpm. Turning is in the arrow direction 72 at the time of reproducing. A tracing stylus 74 is positioned to contact and slide over the disc 71. For example, a signal pickup may be an electrostatic capacitance type. A video signal of two frames is reproduced on every rotation of the disc 71.

The tracing stylus 74 has a tip shape as shown in FIG. 6B. The tracing stylus proper is made of a material such as diamond or sapphire. The entering or leading part 88 of this tracing stylus 74 is formed by the acute vertex of the sliding surface. An electrode 86 made of a metal such as titanium is secured to the back part of the stylus by a sputtering process. The width 87 of the electrode corresponds substantially to the pit width, being approximately 2 μm. in the present embodiment. For preserving the serviceable life of the stylus over a long period, the area of the contacting and sliding part 89 of the stylus tip should be made large. For this purpose, the dimensions of the contact in the longitudinal and transverse directions are made large. The width and area of stylus contact with the disc surface should be large relative to the information pit. Accordingly, the sliding surface 89 makes simultaneous contact with a plurality of pits at the time of contact. The electrode width 87 corresponds to the information width of a single pit. Therefore, while the contact area is amply large, pit information can be picked up in the form of variations of electrostatic capacitance. There is a high sensitivity from the electrode part 86.

The tracing stylus 74 is secured to a moving shaft 78 of a moving coil mechanism 80 by way of a thin leaf spring 75, a shock-absorbing member 76, and a bracket 77. The spring 75 and the shock-absorbing member 76 enable a stable contact between the sliding tip of the tracing stylus 74 and the information surface on the disc 71, with a light pressing force of approximately 30 mg. Furthermore, the light up-and-down pressing force of the tracing stylus 74 is imparted to a signal pickup part 79, which is so constructed that it does not move in the left-and-right direction. The moving coil mechanism 80 is constructed similar to a loudspeaker and comprises a permanent magnet, a driving coil, and a yoke (none shown). The part is axially supported by a damper and is provided with the moving shaft 78. This moving shaft 78 is displaced in its radial direction, that is, in an arrow direction 81, which is the disc radial direction. Shaft 78 is displaced in response to the direction and magnitude of the electric current supplied to the above mentioned driving coil.

By this construction, the signal pickup structure 79 includes the tracing stylus 74 mounted on the moving shaft 78. The tracing stylus 74 is capable of high-speed control driving the tracing stylus 74 in the direction perpendicular to the signal track traced on the disc 71. Furthermore, the signal pickup structure 79 and the moving coil mechanism 80 are mounted on a traversing mechanism (not shown). They travel in a straight line and at a low speed synchronized with the rotational speed of the disc 71. Travel is in the radial direction 82 of the disc 71 at the time of signal recording or reproducing.

Figure 7:
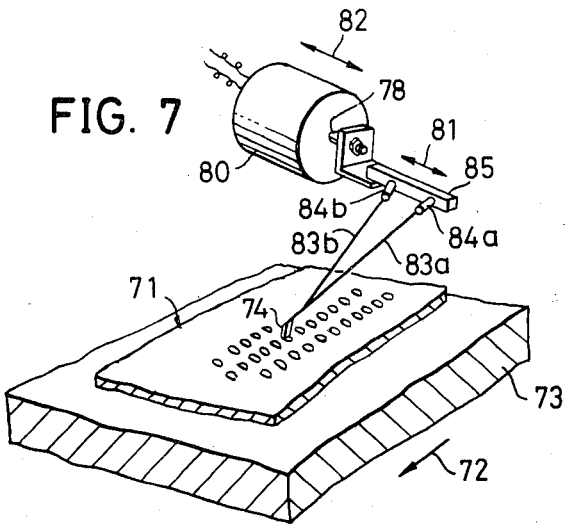
FIG. 7 is a perspective view showing another embodiment of the reproducing tracing means.

Another embodiment of a reproducing tracing means is illustrated in FIG. 7. In FIG. 7, those parts which are the same as corresponding parts in FIG. 6A are designated by like reference numerals. In this tracing device, a bracket having a horizontal extension 85 is mounted on the moving shaft 78 of the moving coil mechanism 80. A pair of cantilever members 83a and 83b are coupled together at their outer ends. At their inner base ends, they are connected to and supported by the horizontal extension 85 of the bracket. The connection is made through dampers 84a and 84b at positions which are respectively spaced apart in the horizontal direction. The tracing stylus 74 is mounted on the joined outer ends of the cantilever members 83a and 83b. By this arrangement, the two cantilever members 83a and 83b and the bracket extension 85 form a triangular structure. The tracing stylus 74 is effectively limited in its free displacement in the horizontal direction relative to the bracket extension 85, but it can freely undergo displacement in the vertical direction, accompanied by flexuous deformation of the dampers 84a and 84b.

In synchronism with the rotation of the disc, the bracket extension 85, fixed to the moving shaft 78, moves radially across disc 71, together with the moving coil mechanism 80. At the same time, an output signal from a tracking servo circuit operates the coil mechanism 80 to move the bracket extension 85 with fine displacements, in the disc radial direction. As a result, the tracing stylus 74 traverses at a very low constant speed, unitarily with the bracket extension 85, in the disc radial direction toward the center of the disc. The stylus 74 thereby traces accurately and positively the main signal recording track. Furthermore, the tracing stylus 74 undergoes a displacement in the vertical direction, accompanied by flexuous deformation of the dampers 84a and 84b and thus faithfully follows the undulations of the disc surface.

Next to be described is a first embodiment (FIGS. 8 and 9) of a reproducing system, according to the present invention.

Figure 8:
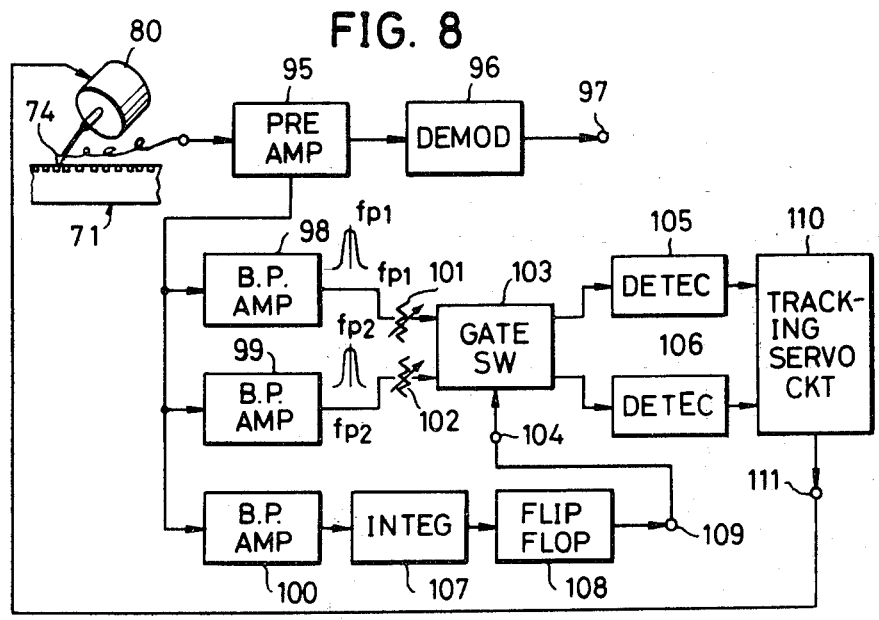
FIG. 8 is a block diagram showing a first embodiment of a reproducing system according to the present invention.
Figure 9:
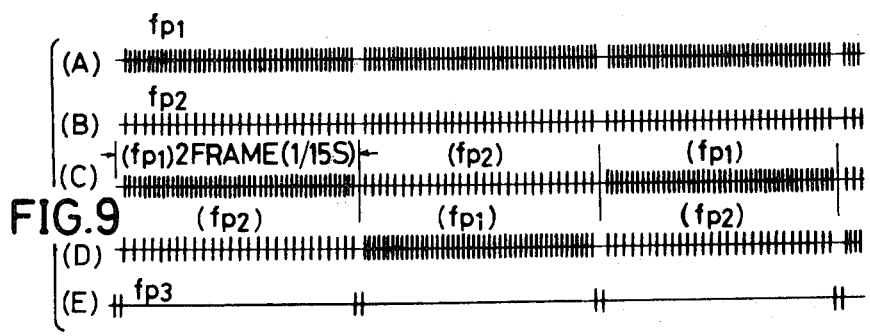
FIG. 9A through FIG. 9E are signal waveform diagrams for explaining the operation of the block diagram in FIG. 8.

In the system shown in FIG. 8, a reproduced signal picked up as a minute variation of electrostatic capacitance by the tracing stylus 74 from the disc 71 is supplied to a preamplifier 95 having a resonant circuit. The resonant frequency varies in response to this variation in electrostatic capacitance and is formed into a signal of a desired level. The resulting output of the preamplifier 95 is demodulated into the original information signal by a demodulator 96 and is sent out as an output through an output terminal 97.

The output signal of the preamplifier 95 is supplied respectively to amplifiers 98, 99, and 100. Here, each of the amplifiers 98 and 99 is a kind of band-pass amplifier. The amplifier 98 is designed to have a steep passing frequency characteristic at only the frequency fp1. The amplifier 99 is designed to have a steep passing frequency characteristic at only the frequency fp2. As a result, the signal of frequency fp1 as indicated in FIG. 9(A) and the signal of frequency fp2 as indicated in FIG. 9(B) are obtained separately from the amplifiers 98 and 99, respectively. These signals respectively pass through level adjustors 101 and 102. The resulting signals are then supplied to a gate switching circuit 103. These reproduced signals fp1 and fp2 are pulse trains respectively having periods corresponding to 2H (2 horizontal scanning periods). Moreover, they have a coinciding phase in the horizontal blanking period of the reproduced video signal. When this horizontal blanking period is approximately 11 microseconds, for example, and the frequencies fp1 and fp2 are set at 500 KHz and 300 KHz, respectively, the signals fp1 and fp2 become cyclic waveforms of approximately 5 cycles and 3 cycles, respectively.

If the recorded signal is a color video signal, and if there is a possibility of the recording and reproducing of the reference signals fp1 and fp2 affecting the color burst signal, it is desirable that the color burst signal position be avoided in the recording of the signals fp1 and fp2.

A switching pulse is generated in the position designated by reference numeral 52 in FIG. 4C and is supplied through an input terminal 104 to the gate switching circuit 103. (This position is the V.BLK part if the recorded main information signal is the video signal.) This switching pulse is a reference which switches the signals fp1 and fp2 every revolution period of the disc 71. The disc rotational speed in the present embodiment of the invention is 900 rpm. as mentioned hereinbefore. Therefore, two frames of the video signal are recorded for each revolution of the disc 71. The switching pulse applied to the input terminal 104 has inverting polarities which change every two frames (1/15 second). As a result, the gate switching circuit 103 supplies a signal as indicated in FIG. 9(C) and a signal as indicated in FIG. 9(D), respectively, to detecting circuits 105 and 106.

The band-pass amplifier 100 is designed to have a band-pass filter characteristic by which it separately filters only the signal of frequency fp3. As indicated in FIG. 9(E), the signal fp3 has been separated and amplified in this band-pass amplifier 100 and is supplied to an integration circuit 107. There, its wave is shaped so that it is not affected by noise and other influences. The wave-shaped signal is then applied to trigger a flip-flop 108. The resulting output of this flip-flop 108 is sent out through an output terminal 109 and applied to the aforementioned input terminal 104.

Means are provided to suppress the effects of interruption, dropouts, noise, etc., in the signal derived from the tracing stylus 74. To obtain an even more stable and accurate switching pulse from the terminal 109, it is desirable to use, before the flip-flop 108, a means such as a flywheel oscillator, which is a free running oscillator at 15 Hz or an AFC circuit that is capable of accomplishing the same function.

The detecting circuits 105 and 106 detect the envelopes of their respective input reference signals and convert the envelopes into DC voltages. These voltages are then supplied to the input terminals of differential amplifiers (not shown) within a tracking servo circuit 110. This tracking servo circuit 110 compares the output signals of the two detecting circuits 105 and 106 which vary in response to the reproduced levels of the signals fp1 and fp2. This generates an output tracking error signal which indicates the tracking error direction and the error quantity. This error signal is further amplified to a specific level by known circuitry. Then, it is applied through an output terminal 111 to the moving coil mechanism 80 of the tracing stylus 74. Thus, the tracking of the tracing stylus 74 is stably controlled by the resulting closed loop.

In operation, the reproduction of the track t2 is to start, continuing from the recording position 52 of the signal fp3, upon completion of the reproduction of the track t1 of the tracing stylus 74, in FIG. 4B. In the instant embodiment of the invention, the reference pulse signal fp3 is extracted from the signal reproduced from track t1. With this signal fp3 as reference, the polarities of the signals fp1 and fp2 are inverted at the reproduction of the track t2. The control direction by the signals fp1 and fp2 is inverted from that at the time of reproduction of the track t1, to control the moving coil mechanism 80. The reason for this is that the reference pulse signals fp1 and fp2 are recorded along the sides of the information track. The reference pulse signals are alternatively switched to opposite sides of each adjacent track, as is apparent from the explanation of the track pattern used in the recording system. For example, in the direction which the stylus traces along the track, the signal fp1 is formed on the right side of the track t1, while the signal fp2 is formed on the left side of the track t1; the signal fp1 is formed on the left side of the track t2, while the signal fp2 is formed on the right side of the track t2. For this reason, at the time of reproduction of the track t2, the tracing stylus is controlled in its tracking and moved toward the outer periphery of the disc 71 responsive to the reproduction of the signal fp1, and then moved toward the center of the disc by the reproduction of the signal fp2. Therefore, this time, it is possible to trace accurately and positively in succession over the track t2.

The track t3 is reproduced upon completion of the tracing of the track t2, per revolution. By the inversion again of the polarities of the signals fp1 and fp2 at the recording position 52 of the signal fp3, tracing and tracking of the track t3 is similarly carried out. Similarly thereafter, the signal pickup structure 79 shown in FIG. 6A accurately and positively traces and reproduces the successive track paths following one after another. The pickup successively moves, with a specific pitch, in the radial direction of the disc 71, for example, from the outer periphery toward the center of the disc. Thus, a normal reproduced picture is obtained.

The present invention reproduces a still motion picture by continuous reproduction of the same track and reproduces slow-motion pictures by repeated reproduction of each track. For example, upon completion of the first time reproduction of the track t1, a pulse is obtained responsive to the pulse signal fp3 which is detected from the signal recording position 52. This pulse signal has a compulsory power, with respect to the tracking servo circuit 110, and is applied from outside. A signal is applied from a tracking servo amplifier (not shown) to the moving coil mechanism 80. The tracing stylus is caused to jump or kick back at the position 52. In this manner, a continuous tracing of only the track t1 can be effected.

Furthermore, it is also possible by reducing to ⅓ the traversing speed of the signal pickup structure 79 in the disc radial direction. The above described operation is repeated three times for reproducing each of the succeeding tracks in a desired reproduced picture, for example. Interrelatedly with this, the switching pulses of the signals fp1 and fp2 are processed so that the same track will be reproduced three times each, and a 3:1 slow-motion picture is obtained. In addition, various operations such as high-speed searching, determination of the starting point of reproducing and forward-reverse reproduction can be carried out as desired.

Figure 10A:
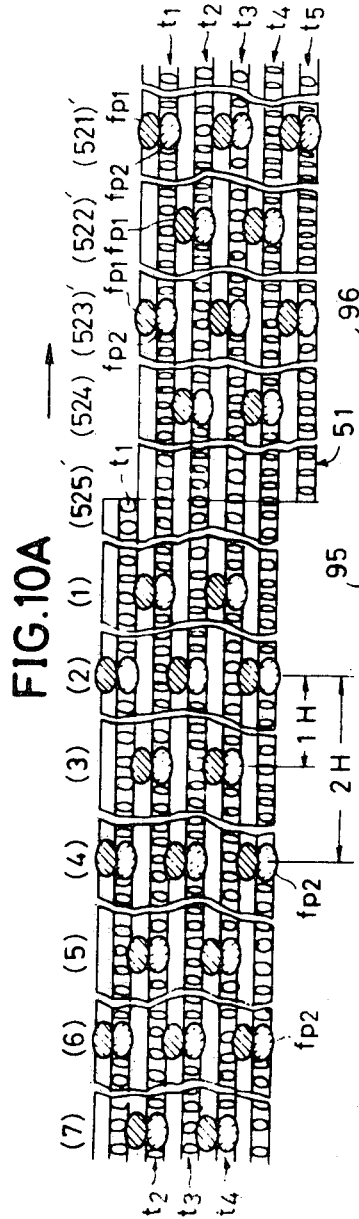
FIG. 10A and FIG. 10B are enlarged diagrams respectively showing a portion of track pattern of a third embodiment, which is recorded and formed by the system of the present invention.
Figure 10B:
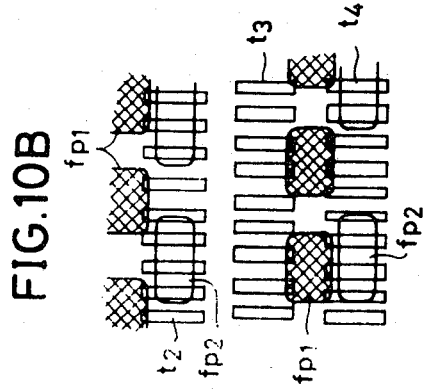

A third embodiment of a track pattern on the disc is illustrated in FIGS. 10A and 10B. The operation of a recording system for recording according to this track pattern will now be described.

In the system shown in FIG. 1, the output signal fp2 of the oscillator 20 is applied to the adder 34, as indicated by an intermittent line. After being combined at a suitable level with the frequency modulated video signal from the frequency modulator 15, the combination signal is supplied to the light beam modulator 16. Furthermore, only the signal fp1 from the oscillator 20 is applied to the light beam modulator 24. Thereafter, in accordance with the same operation as described for FIG. 1, the recording on the disc is made by first and second modulated light beams.

The track pattern on the disc is indicated simulatively in FIG. 10A. In the part midway between successive tracks, the signal fp1 is recorded in 2H periods. Moreover, the positions indicated by an oval, with full-line cross hatching, correspond to the recorded part of the horizontal blanking period of the video signal. The signal fp2 is recorded in phase-synchronism with the signal fp1 in 2H periods on the video signal recording tracks (t1, t2, t3, ... ). The positions indicated by a circle with broken-line cross hatching are within the horizontal blanking period of the video signal.

The track pattern in FIG. 10A is shown in a simulative form for convenience in description, and it is similar to the track pattern shown in FIG. 4B. In the present embodiment of the invention, it is not necessary to record the signal fp3 as discussed hereinafter. The part of the track pattern shown in FIG. 10A, corresponding to the recording of the horizontal synchronizing signal, is shown in an enlarged form close to the actual in FIG. 10B.

Here, the oscillators 20 and 21 generate the signals fp1 and fp2 which are successively recorded at every rotational period of the disc which deviates by 1H with respect to every adjacent track, and with reference to the third reference signal recording position 52. This position 52 is the reference position phase for the time of switching, and it is similar to the reference described hereinbefore in conjunction with FIG. 4B. Control pulses for controlling the oscillators can be readily formed by using a circuit for setting and resetting, with a two-frame period pulse, by separating the horizontal synchronizing pulses of the recorded video signal and by a ½ count logical circuit.

Figure 11:
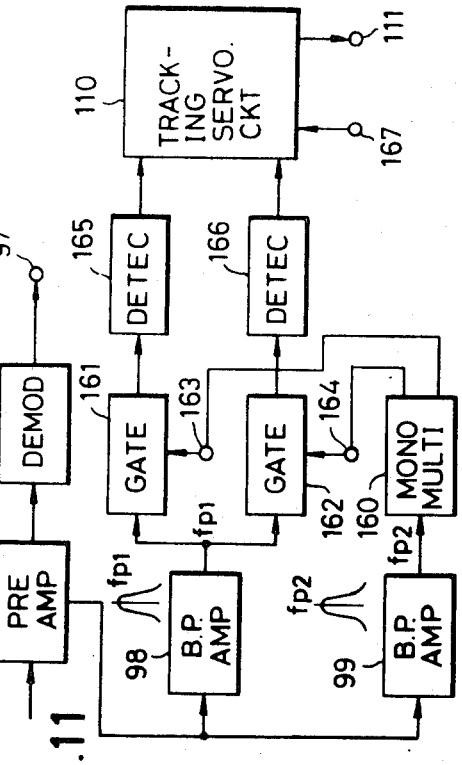
FIG. 11 is a block diagram showing a second embodiment of a reproducing system according to the present invention.

Next to be described is an embodiment (FIG. 11) of a system for reproducing a disc having the track pattern indicated in FIGS. 10A and 10B. In FIG. 11, those parts which are the same as corresponding parts in FIG. 8 are designated by the same reference numerals. For example, of the signals picked up and reproduced by the tracing stylus 74, only the signal fp1 is led out from the band-pass amplifier 98 and applied respectively and simultaneously to gate circuits 161 and 162. Furthermore, the signal fp2 led out from the band-pass amplifier 99 is applied as a trigger pulse to a monostable multivibrator 160 having an oscillation time constant of approximately 1.5H. This monostable multivibrator 160 produces cyclically recurring output pulses of a 2H period. These pulses are applied as a gate pulse through input terminals 163 and 164, respectively, to gate circuits 161 and 162. The signal fp1, which has been reproduced, is separated from other signals by the band-pass amplifier 98 and is gated with the required time and polarity. Here, the signal fp1 from the band-pass amplifier 98 is the signal fp1 which is disposed and recorded on the outer peripheral side of the tracing track position at the same time that the signal fp2 is reproduced. The signal fp1 is also disposed and recorded on the inner peripheral side of the tracking track at the time point position which is delayed by 1H relative to the reproduced position of the signal fp2, as a reference.

Accordingly, from the gate circuits 161 and 162, the signal fp1 is produced at the same time point (outer peripheral side) as the reproduced signal fp2. The signal of only the signal fp1 (inner peripheral side) is produced with the time phase delayed by 1H from the reproduction time point of the reproduced signal fp2. These signals are respectively and discriminately gated and produced as output signals by the above mentioned gate pulse. Thus, the track tracing error of the tracing stylus 74 is discriminated.

Thereafter, the output signals fp1 from the gate circuits 161 and 162 are introduced respectively into detecting circuits 165 and 166 where they are converted into DC components. These output signals are tracking error signals which correspond to the direction and amount of the error at the time of tracking control, and they are applied to the tracking servo circuit 110. Tracking servo operation is carried out by the servo circuit 110 in the same manner that is illustrated in FIG. 8. A particular feature of the present embodiment of the invention is that a normal reproduced picture can be obtained without having to switch the polarities of the tracking control signals responsive to every disc rotation by using the signal fp3 as in the embodiment of the invention shown in FIG. 8.

Furthermore, the signal fp1 may be recorded alone in a specific part intermediate between successive tracks. The reference signal fp2 is recorded for discriminating at the time or at reproducing. For example, there may be a change of the synchronizing pulse width of the corresponding parts of the horizontal synchronizing pulses of the video signal. Alternatively, the signal fp2 may be obtained by shaping the horizontal synchronizing pulses of the recorded video signal. It may be inserted and added into the positions of the synchronizing pulses.

Furthermore, a still picture or a slow-motion picture can be obtained in the present embodiment of the invention by obtaining the third reference signal fp3 from the reproduced signal. This signal fp3 is shaped into a specific pulse width and amplitude, and formed into a driving pulse of positive polarity or negative polarity having a two-frame period pulse. The moving coil mechanism 80 kicks back one track in either the forward or rearward direction at every desired period with the vertical blanking period. In this operation, this driving pulse is applied through an input terminal 167 to the tracking servo circuit 110.

In addition, if the main information signal and the reference signals for tracking control are recorded in an overlapped state, these main information pits and tracking reference bits can be reproduced simultaneously at the time of reproduction. Accordingly, to make it possible to separately reproduce the signals fp1 and fp2 at the time of reproduction, these signals fp1 and fp2 may be recorded by simultaneous light modulation of the same light-beam modulator. The reference signals for tracking control are not limited to the three signals of the frequencies fp1, fp2, and fp3, but they may be any plural number. Furthermore, there is no special necessity for inserting and recording the signal fp3. At the time of reproduction, this signal may be mechanically generated interrelatedly with the rotation of the disc.

Another embodiment of a recording system of the invention will now be described in conjunction with FIGS. 12 and 13. For convenience in description, the case wherein a video signal of four fields is recorded and reproduced every revolution period of the disc will be considered as one example.

In the system shown in FIG. 12, a video signal a is indicated at FIG. 13(A) with a field taken as a unit. The signal is introduced through an input terminal 171 and is supplied to a synchronizing signal separation circuit 172 and a mixer 184. The separated synchronizing signal is supplied respectively to a vertical synchronizing signal separation circuit 173 and a gate circuit 179. The resulting vertical synchronizing signal b, as indicated in FIG. 13(B), is led out from the vertical synchronizing signal separation circuit 173 and counted down by $\frac{1}{2}$ by a flip-flop 174 and is further counted down by $\frac{1}{2}$ by a flip-flop 175. The respective output pulses of the flip-flops 174 and 175 have pulse recurrence frequencies which, as indicated at c and d in FIGS. 13(C) and 13(D), are $\frac{1}{2}$ and $\frac{1}{4}$ of the field frequency and are both supplied to the gate circuit 179.

On the one hand, the vertical synchronizing signal from the separation circuit 173 is formed into pulses having a suitable position and width. This forming is done by monostable multivibrators 176 and 177 which are connected in cascade. Further, they are synchronized with a synchronizing signal by a J-K flip-flop 178 and then formed into the pulses e indicated in FIG. 13(E). These pulses e are supplied to the gate circuit 179. As a result, pulses f have a four-field period and a pulse width equal to 1 and to a number of H periods (H being the horizontal scanning period) within the vertical blanking period of the video signal a. As indicated in FIG. 13(F), these signals are gated and derived from the gate circuit 179.

FIG. 13(G) shows vertical synchronizing signals and equalizing pulses within the vertical blanking period of the video signal a. FIG. 13(H) shows an enlarged waveform in the vicinity of the pulse width f1 of the output pulses f of the gate circuit 179. The output pulse f1 of the gate circuit 179 is supplied to a pulsed oscillator 180, an inverting amplifier 181, and a monostable multivibrator 182. The pulsed oscillator 180 may be any well known circuit, for generating a sinusoidal wave only when the input pulse is either a logical "1" or "0". In the present embodiment, it is adapted to oscillate only when the logical "0" is attained. Accordingly, the output signal of the pulsed oscillator 80 becomes as indicated by i in FIG. 13(I), and is supplied to a mixer 184. The output frequency of the pulsed oscillator 180 is high as compared with the frequency of the synchronizing signal. A preferable result can be obtained, in practice, by selecting a frequency of about 1 MHz to 2 MHz.

The pulse is inverted and amplified by the inverting amplifier 181 and supplied to the mixer 184. There, it is mixed with the signal i and the video signal a at a predetermined level ratio. Accordingly, a video signal j is superimposed on the sinusoidal wave at its gray level. The gray level is a portion (equalizing pulses, in this case) following the vertical synchronizing signal within the V.BLK period and is derived from the mixer 184 and applied through an output terminal 185. The video signal j is then supplied to the input terminal 14 in FIG. 1.

It will be understood from the above description that the parts where the sinusoidal wave and the gray level are superimposed upon each other in the video signal j appear after every four-field period, i.e., in a period of one rotation of the recording medium.

On the one hand, a monostable multivibrator 182 is triggered by the leading edge (in the present embodiment) of the output pulse f from the gate circuit 179. This supplies a pulse to a flip-flop 183 which eliminates cut-in parts such as the equalizing pulses within the V.BLK period. The flip-flop 183 sends out, from the terminals Q and $\overline{Q}$ to the output terminals 186 and 187, the pulses which are of opposite phase and are inverted periods of four fields respectively. The pulses Q and $\overline{Q}$ from the output terminals 186 and 187 are respectively applied to the pulsed oscillators (corresponding to the oscillators 20 and 21 in FIG. 1) for generating the reference signals fp1 and fp2 which are used for tracking control operation. Signals fp1 and fp2 cause the pulsed oscillators to alternately generate every four-field period. The reference signals fp1 and fp2 are selected so that the frequencies differ mutually and are in a frequency range, for instance, which is lower than the range of the main track recording signal. Further, the reference signals fp1 and fp2 are recorded, similar to the recording described with reference to FIG. 1. Signals fp1 and fp2 are recorded alternately on every period of each single rotation of the recording medium (every four-field interval, in this case). Recording is at an intermediate point between the adjacent main tracks as a change of geometrical configuration, thereby forming the sub-track.

Accordingly, the illustration of the track pattern on the rotating recording medium is omitted. It is composed of either a spiral or a coaxial circle main track on which at least a frequency modulated video signal has been recorded, as a change of geometrical configuration. Sub-tracks of the signals fp1 and fp2 are formed at both sides of the main track. In the present embodiment, at least either the gray level signal or the single frequency signal (sinusoidal wave) is further inserted, as the reference signal fp3, in a partial section or the whole section of the V.BLK period of the recording video signal. This period corresponds to the recording switching positions of the signals fp1 and fp2. In the present embodiment, both the gray level signal and the single frequency signal are inserted and recorded.

The detection of the recording switching points between the signal fp1 and the signal fp2 may be effected responsive to only the gray level signal thus recorded. However, it is more advantageous to record the single frequency signal from the point of view of S/N ratio, because a band-pass filter is used in the reproducing system. Further, when recording both the gray level signal and the single frequency signal, the recording amplitude of the video signal may be enlarged to the allowable limit, thereby providing an advantageous S/N ratio.

FIG. 14 is a block diagram of the essential part of a modification for the recording system in FIG. 12. In FIG. 14, the parts which correspond to those in FIG. 12 are designated by the like reference numerals. In the embodiment in FIG. 12, the signals fp1 and fp2 are recorded even in the V.BLK periods as detection signals for indicating the recording switching position of the reference signals fp1 and fp2. However, when the switching timing is taken into consideration, it is advantageous not to have the signals fp1 and fp2 recorded within the period having the detection signal inserted therein.

The system of this modification has gate circuits 188 and 189 for gating the output Q and $\overline{Q}$ of the flip-flop 183, and by commonly using the output pulse of the monostable multivibrator 182 as gate pulses for the gate circuits 188 and 189. The pulse width of the output pulse from the monostable multivibrator 182 is in the same order as the pulse width of the output pulse of the monostable multivibrator 177 for adjusting the pulse width as indicated in FIG. 12. The gate circuits 188 and 189 are switched off only over the period of the pulse width. Accordingly, from the output terminals 190 and 191 of the gate circuits 188 and 189, no pulses are derived during the detection signal insertion period, in a period of four fields. Therefore, during the above described period, the oscillation of the pulsed oscillator for generating the signals fp1 and fp2 is stopped.

Next to be described with reference to FIG. 15 is an essential part of a third embodiment of a reproducing system according to the present invention.

A reproduced signal introduced through an input terminal 192 is supplied to a synchronizing signal separation circuit 193 and to a gate circuit 196. A synchronizing signal separated in the circuit 193 is supplied to a vertical synchronizing signal separation circuit 194. There, only the vertical synchronizing signal is separated. Then, it is supplied to a gate pulse generator 195, where a gate pulse having a period of four fields is generated. The gate pulse thus generated is supplied to switch on a gate circuit 196 only during the detection signal insertion period. Accordingly, from the output side of the gate circuit 196, a sinusoidal wave having a single frequency is superimposed on a video signal introduced at input terminal 192 during a period of four fields for 1H to several H periods within the V.BLK period. The sinusoidal wave is discriminated by a narrow band-pass amplifier 197 having a passing frequency band with a center frequency which is equal to the oscillation frequency of the pulsed oscillator 180 indicated in FIG. 12. The output signal of the band-pass amplifier 197 is detected by a detector 198 and is then applied to a flip-flop 199 as a trigger pulse. Therefore, the flip-flop 199 produces a pulse which is inverted during every period of a single rotation of the recording medium. This pulse is derived from an output terminal 200 and is used as a pulse for switching the signals fp1 and fp2 supplied to the input terminal of the tracking control circuit.

If only the gray level signal is superimposed, as a detection signal on the video signal, a circuit for detecting the direct current level may be used instead of the band-pass amplifier 197. Accordingly, the recording switching position of the fp1 and fp2 is electrically detected by the output pulses from the output terminal 200, whereby the tracking error voltage is inverted.

Further, by using the narrow band-pass amplifier in the reproducing system, the above described superimposed signal is reproduced in a stable manner even if the S/N ratio of the demodulated video signal deteriorates. Still further, since the gray level signal or the single frequency signal, or both of the superimposed signals exist continuously for a certain period within the V.BLK period, the influence of the drop-out or deficiency thereof may be almost eliminated.

Further, the recording system indicated in FIG. 1 is arranged to use the laser beam, as a preferred embodiment, but an electron beam may be also used.

The embodiments set forth are described for reproducing the disc 71 recorded in a pit pattern by means of an electrostatic tracing stylus. The reproducing tracing means is not limited to the tracing stylus type, but the laser beam, for instance, may be used.

The embodiments describe a system wherein the information signal is recorded as a change of the geometrical configuration, and the medium thus recorded is reproduced. The system according to the present invention is applied or adapted to magnetically recording and reproducing. One embodiment of the magnetic recording and reproducing system will be described in conjunction with FIG. 16 and FIG. 17.

FIG. 16 shows a track pattern on a disc-shaped magnetic recording medium (for example, a magnetic sheet) 211. A reference signal fp1 is indicated by full lines and a reference signal fp2 is indicated by intermittent lines. They are alternately recorded every period of one revolution on one part of the information signal tracks t1, t2, t3, . . . .

A magnetic head assembly 212 as shown in FIG. 17 is used for forming this track pattern. This head assembly 212 comprises a main magnetic head 213 and a sub-magnetic head 214 of track widths T1 and T2 spaced apart by a specific interval 216 in the track tracing direction. Moreover, the heads are disposed in a staggered state to such an extent that they partially overlap each other in the track width (transverse) direction with respect to the centerline 217 in the track tracing direction. The heads 213 and 214 are shielded from each other by a shield plate 215 which is provided therebetween.

At the time of recording, the main magnetic head 213 records the information signal. For example, a modulated video signal is successively recorded on the main tracks t1, t2, t3, . . . . At the same time, switching pulses of positive polarity are produced only in the horizontal blanking period of the video signal to be recorded with a 2H period, for example. Switching pulses are formed from horizontal synchronizing pulses separated from the video signal to be recorded. The signals fp1 and fp2 are produced by an oscillator which is started only when these switching pulses are in a positive polarity period and is stopped in other periods. These signals are applied alternately every period of one revolution to the sub-magnetic head 214. This sub-magnetic head 214 records the signal fp1 or fp2 as a reference signal in the intermediate parts g1, g2, . . . between the main tracks. Recording is in a partially overlapping state with respect to the main tracks t1, t2, . . . every 2H period, for example, during one period of revolution of the disc. Furthermore, the reference signals fp1 and fp2, respectively, are recorded in mutually adjacent parts of one main track, at positions which are staggered by 1H, for example.

On the one hand, the timing pulse signal fp3 is recorded by the main magnetic head 213 or the sub-magnetic head 214 in the vertical blanking period in the video signal every period of one revolution. With a rotational speed of the rotating magnetic recording medium 211 of 1,800 rpm., a video signal of a field frequency of 60 Hz is recorded. The pulse recurrence frequency of the signal fp3 becomes 30 Hz.

At the time of reproduction, the signal reproduced by the sub-magnetic head 214 is not used, and only the reproduced signal of the main magnetic head 213 is used. The reference signal fp1 or fp2 is reproduced simultaneously with the information signal from the main head 213. From these reproduced signals, the reference signals fp1 and fp2 are discriminately reproduced, and their phases and levels are detected. As a result, the direction and magnitude of mistracking can be detected. The tracking control of the head assembly 212 is therefore carried out somewhat as described hereinbefore.

In this connection, it will be apparent that a magnetic tape may be used for the magnetic recording medium and that a rotating magnetic head may be used for the head assembly.

The system of the present invention is applicable not only for recording and reproducing of video signals but also for recording and reproducing audio signals, and the like, only by a high dynamic range with high quality, and for recording an audio signal with multichannels on the same single track. The reproducing and tracking of this recorded information track is somewhat as described hereinbefore.

Furthermore, a plurality of reference signals are discriminately reproduced for tracking control of mutually different frequencies and are used for tracking control signals, as has been described above with respect to certain embodiments of the invention. The present invention may be practiced through the use of only a single reference signal. In this case, the recording positions of the reference signals are recorded by the aforementioned second modulated light beam which may be set at positions apart from each other with every specific period for every successive formed track. For example, separation may be every 3H interval as an H period unit in the case of a video signal in substantially the intermediate parts between tracks recorded. The recorded signals are formed by the aforementioned first modulated light beam as modulated by the main information signal. In this case, the reference signals are recorded at positions in the same radial line at intervals of three tracks. At the time of reproducing, by discriminatingly gating these reproducing time phases, the direction and quantity of mistracking errors can be detected, and tracking control can be carried out.

In addition, the respective single-frequency signals are used for the signals fp1 and fp2, as described in the foregoing disclosure. Signals which have been produced by frequency modulating audio signals, for example, and which have been continuously recorded may be used as the reference signals fp1 and fp2. Further modifications are also possible, such as frequency converting the carrier color signal to a low-frequency range by a known technique and applying it to the reference signals fp1 and fp2. The essential requirement is that the reference signal is recorded and reproduced in a form which can be applied to at least tracking control.

Further, this invention is not limited to these embodiments. Variations and modifications may be made without departing from the scope and spirit of the invention.

What is claimed is:

1. A recording disc having a plurality of track turns recorded thereon, information signal track turn means having a video signal recorded thereon, a track pitch of the information signal track turn means being substantially equal to a width of said information signal track turn means; and reference signal track turn means having reference signals recorded thereon; each of said reference signal track turn means being formed on a intermediate part of said recording disc located between center lines of adjacent information signal track turn means, each of the reference signal track turn means having a width narrower than the width of the information signal track turn means and being recorded so as to overlap on the adjacent information signal track turn means, the reference signals being a plurality of different kinds of signals with each individual reference signal being recorded along a reference signal track turn means, two of said different kinds of reference signals being alternately recorded on every other reference signal track turn means on the recording disc at positions corresponding to the horizontal blanking periods of the video signal recorded on the information signal track turn means.

2. The recording disc of claim 1 wherein the reference signal track turn means are superimposed on and overlap the information signal track turn means.

3. The recording disc of claim 2 wherein the information signal track turn means and the reference signal track turn means are respectively formed as changes of a geometrical configuration.

4. The recording disc of claim 1 wherein said reference signals are first and second reference signals which have different frequencies; said first and second reference signals being recorded alternately during each rotation of the disc; and a third reference signal recorded on the reference signal track turn means at positions corresponding to the positions where the reference signals recorded on the reference signal track turn means are switched to alternate between the first and second reference signals.

5. The recording disc of claim 4 wherein said third reference signal is recorded on the reference signal track turn means at positions corresponding to the vertical blanking periods of the video signal recorded on the information signal track turn means.

6. The recording disc of claim 1 wherein said reference signals are first and second reference signals which have different frequencies; said first and second reference signals being recorded alternately during each rotation of the disc; and a third reference signal recorded on the information signal track turn means at positions corresponding to the positions where the first and second reference signals are switched on the reference signal track turn means.

7. The recording disc of claim 6 wherein said third reference signal is recorded on the information signal track turn means at positions corresponding to the vertical blanking periods of the video signal recorded on the information signal track turn means.

* * * * *